(12) United States Patent
Grabis

(10) Patent No.: US 12,152,629 B2
(45) Date of Patent: Nov. 26, 2024

(54) ATTACHMENT STRUCTURE HAVING A CONNECTION MEMBER WITH MULTIPLE ATTACHMENT FEATURES

(71) Applicant: Divergent Technologies, Inc., Los Angeles, CA (US)

(72) Inventor: Michael Marek Grabis, Long Beach, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 9 days.

(21) Appl. No.: 18/159,046

(22) Filed: Jan. 24, 2023

(65) Prior Publication Data

US 2023/0235766 A1   Jul. 27, 2023

Related U.S. Application Data

(60) Provisional application No. 63/302,993, filed on Jan. 25, 2022.

(51) Int. Cl.
*E21B 17/046* (2006.01)
*F16B 7/18* (2006.01)

(52) U.S. Cl.
CPC .................. *F16B 7/182* (2013.01)

(58) Field of Classification Search
CPC ....... F16B 7/182; F16L 15/003; F16L 15/008; B29C 70/72; B29C 70/683; B29C 70/682
See application file for complete search history.

(56) References Cited

U.S. PATENT DOCUMENTS

| | | |
|---|---|---|
| 5,203,226 A | 4/1993 | Hongou et al. |
| 5,742,385 A | 4/1998 | Champa |
| 5,990,444 A | 11/1999 | Costin |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)

(Continued)

*Primary Examiner* — Daniel J Wiley
(74) *Attorney, Agent, or Firm* — ARENTFOX SCHIFF LLP

(57) ABSTRACT

The present aspects include an adhesive and mechanically bonded adapter or node. The adapter or node comprises a connection member, including: an outer wall extending in a first direction from a first proximal end to a first distal end; an inner wall extending within the outer wall, in the first direction, from a second proximal end to a second distal end; and a base wall extending from an inner surface of the outer wall to an outer surface of the inner wall between the first proximal end and the second proximal end; and wherein the outer wall, the inner wall, and the base wall define a space having a distance between the outer wall and the inner wall that varies in the first direction, wherein the space is configured to fixedly position an end portion of a tube inserted into the space such that the end portion is fixed to the inner surface of the outer wall and the outer surface of the inner wall.

18 Claims, 6 Drawing Sheets

(56) References Cited

U.S. PATENT DOCUMENTS

| | | |
|---|---|---|
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |

(56) References Cited

U.S. PATENT DOCUMENTS

| | | |
|---|---|---|
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |

(56) References Cited

U.S. PATENT DOCUMENTS

| | | |
|---|---|---|
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2003/0166418 A1* | 9/2003 | Wentworth ............ E21B 17/046 464/18 |
| 2005/0062288 A1* | 3/2005 | Alaria .................... F16L 15/08 285/357 |
| 2006/0108783 A1 | 5/2006 | Ni et al. |
| 2014/0084583 A1* | 3/2014 | Hemingway ........... F16L 37/02 264/401 |
| 2014/0277669 A1 | 9/2014 | Nardi et al. |
| 2015/0323110 A1* | 11/2015 | Trivett ................. F16L 19/103 285/389 |
| 2017/0074051 A1* | 3/2017 | Atkins ................. E21B 17/046 |
| 2017/0113344 A1 | 4/2017 | Schönberg |
| 2017/0314337 A1* | 11/2017 | Langenfeld ............ F16L 25/08 |
| 2017/0341309 A1 | 11/2017 | Piepenbrock et al. |
| 2018/0056318 A1* | 3/2018 | Jackson ................ F16L 15/003 |
| 2018/0148985 A1 | 5/2018 | Slaughter, Jr. et al. |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion in PCT/US2023/061270, mailed May 10, 2023, 16 pages.

* cited by examiner

ATTACHMENT STRUCTURE HAVING A CONNECTION MEMBER WITH MULTIPLE ATTACHMENT FEATURES

CROSS-REFERENCE TO RELATED APPLICATIONS

This application claims priority to U.S. Provisional Application No. 63/302,993 titled "ADHESIVE AND MECHANICALLY BONDED ADAPTER," filed Jan. 25, 2022, which is assigned to the assignee hereof, and incorporated by reference in its entirety as if fully set forth herein.

TECHNICAL FIELD

The present disclosure generally relates to an attachment structure also referred to as an adapter or "node," and more particularly, to an attachment structure with multiple attachment features that have various methods of attachment to a carbon fiber or composite tube.

BACKGROUND

An adapter or node, referred to herein as an attachment structure, is used to connect other structures in a multitude of manufacturing processes. For instance, one or more attachment structures may be used in space frame construction for automotive, structural, marine, and many other applications. One example of space frame construction can be a welded tube frame chassis construction, often used in low volume and high performance vehicle design due to the advantages of low tooling costs, design flexibility, and the ability to produce high efficiency structures. These structures require that tubes of the chassis be connected at a wide variety of angles and may require the same connection point to accommodate a variety of tube geometries. Traditional methods fabrication of attachment structures for connection of such tube frame chassis may incur high equipment and manufacturing costs, as such attachment structures are often complicated to cast or machine.

Thus, improvements are desired in the design and manufacture of attachment structures.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one example, the present aspects include an adhesive and mechanically bonded adapter. The adapter or node is connected to a carbon fiber or composite tube through a variety of methods, namely through the use of a mechanically fastened joint and/or an external adhesively bonded surface. This attachment method would further consist of threading the adapter into the end of the carbon fiber or composite tube. Prior to or after the adapter is set in place, adhesive can be injected into the open external channel to reinforce the joint.

In an aspect, more specifically, a structure comprises a connection member, including: an outer wall extending in a first direction from a first proximal end to a first distal end; an inner wall extending within the outer wall, in the first direction, from a second proximal end to a second distal end; and a base wall extending from an inner surface of the outer wall to an outer surface of the inner wall between the first proximal end and the second proximal end; and wherein the outer wall, the inner wall, and the base wall define a space having a distance between the outer wall and the inner wall that varies in the first direction, wherein the space is configured to fixedly position an end portion of a tube inserted into the space such that the end portion is fixed to the inner surface of the outer wall and the outer surface of the inner wall.

Another example aspect includes a structure wherein the outer surface of the inner wall includes an engagement feature configured to increase a resistance to removal of the tube from the space after being inserted into the space.

Another example aspect includes a structure wherein the engagement feature comprises at least a first threaded surface. The structure further comprises the tube inserted into the space, wherein an inner surface of the tube comprises a second threaded surface corresponding to the first threaded surface, and wherein the second threaded surface is at least pre-threaded before the insertion of the tube into the space or formed by the first threaded surface when the tube is inserted into the space.

Another example aspect includes a structure wherein the inner surface of the outer wall includes an engagement feature configured to increase a resistance to removal of the tube from the space after being inserted into the space.

Another example aspect includes a structure comprising: the tube inserted into the space; and an adhesive that at least adheres the inner surface of the outer wall to an outer surface of the tube or adheres the outer surface of the inner wall to an inner surface of the tube.

Another example aspect includes a structure wherein the distance between the outer wall and the inner wall increases in the first direction and wherein a diameter of the outer surface of the inner wall of the connection member decreases in the first direction.

Another example aspect includes a structure wherein the inner surface of the outer wall of the connection member has a constant diameter in the first direction.

Another example aspect includes a structure wherein a diameter of the inner surface of the outer wall of the connection member increases in the first direction.

Another example aspect includes a structure wherein an inner diameter of an inner surface of the inner wall of the connection member decreases or remains constant in the first direction.

Another example aspect includes a structure wherein the outer surface of the inner wall of the connection member decreases in diameter in the first direction and the inner surface of the outer wall of the connection member has a constant diameter in the first direction.

Another example aspect includes a structure wherein the connection member is configured to form a gap between an end surface of the end portion of the tube and the base wall when the tube is inserted into the space, and further configured to include an adhesive in the gap to adhere the tube to the connection member.

Another example aspect includes a structure wherein the outer wall has a first longitudinal length in the first direction, wherein the inner wall has a second longitudinal length in the first direction, and wherein the first longitudinal length is greater than the second longitudinal length.

Another example aspect includes a structure wherein the connection member further comprises a base member, wherein the outer wall and the inner wall extend from the base member.

Another example aspect includes a structure wherein the connection member is 3-D printed.

Another example aspect includes a method of assembling an assembly structure, the method comprising: positioning a tube adjacent to a connection member, wherein the connection member includes: an outer wall extending in a first direction from a first proximal end to a first distal end; an inner wall extending within the outer wall, in the first direction, from a second proximal end to a second distal end; and a base wall extending from an inner surface of the outer wall to an outer surface of the inner wall between the first proximal end and the second proximal end; and wherein the outer wall, the inner wall, and the base wall define a space having a distance between the outer wall and the inner wall that varies in the first direction; inserting an end portion of the tube, in a second direction opposite the first direction, into the space; attaching at least the inner surface of the outer wall to an outer surface of the tube or the outer surface of the inner wall to an inner surface of the tube.

Another example aspect includes a method of assembling an assembly structure wherein inserting includes rotating the end portion relative to the connection member about the first direction.

Another example aspect includes a method of assembling an assembly structure wherein the outer surface of the inner wall includes a threaded surface.

Another example aspect includes a method of assembling an assembly structure, further comprising positioning adhesive in the space prior to inserting the end portion of the tube into the connection member, wherein at least attaching the inner surface of the outer wall to the outer surface of the tube or attaching the outer surface of the inner wall to the inner surface of the tube includes attaching with the adhesive.

Another example aspect includes a method of assembling an assembly structure wherein the outer surface of the inner wall includes an engagement feature configured to increase a resistance to removal of the tube from the space after being inserted into the space.

Another example aspect includes a method of assembling an assembly structure wherein the engagement feature comprises at least a first threaded surface. The method further comprises the tube inserted into the space, wherein an inner surface of the tube comprises a second threaded surface corresponding to the first threaded surface, and wherein the second threaded surface is at least pre-threaded before the insertion of the tube into the space or formed by the first threaded surface when the tube is inserted into the space.

Another example aspect includes a method of assembling an assembly structure wherein the inner surface of the outer wall includes an engagement feature configured to increase a resistance to removal of the tube from the space after being inserted into the space.

Another example aspect includes a method of assembling an assembly structure wherein the distance between the outer wall and the inner wall increases in the first direction and wherein a diameter of the outer surface of the inner wall of the connection member decreases in the first direction.

Another example aspect includes a method of assembling an assembly structure wherein the inner surface of the outer wall of the connection member has a constant diameter in the first direction.

Another example aspect includes a method of assembling an assembly structure wherein a diameter of the inner surface of the outer wall of the connection member increases in the first direction.

Another example aspect includes a method of assembling an assembly structure wherein an inner diameter of an inner surface of the inner wall of the connection member decreases or remains constant in the first direction.

Another example aspect includes a method of assembling an assembly structure wherein the outer surface of the inner wall of the connection member decreases in diameter in the first direction and the inner surface of the outer wall of the connection member has a constant diameter in the first direction.

Another example aspect includes a method of assembling an assembly structure wherein the connection member is configured to form a gap between an end surface of the end portion of the tube and the base wall when the tube is inserted into the space, and further configured to include an adhesive in the gap to adhere the tube to the connection member.

Another example aspect includes a method of assembling an assembly structure wherein the outer wall has a first longitudinal length in the first direction, wherein the inner wall has a second longitudinal length in the first direction, and wherein the first longitudinal length is greater than the second longitudinal length.

Another example aspect includes a method of assembling an assembly structure wherein the connection member further comprises a base member, wherein the outer wall and the inner wall extend from the base member.

Another example aspect includes a method of assembling an assembly structure wherein the connection member is 3-D printed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
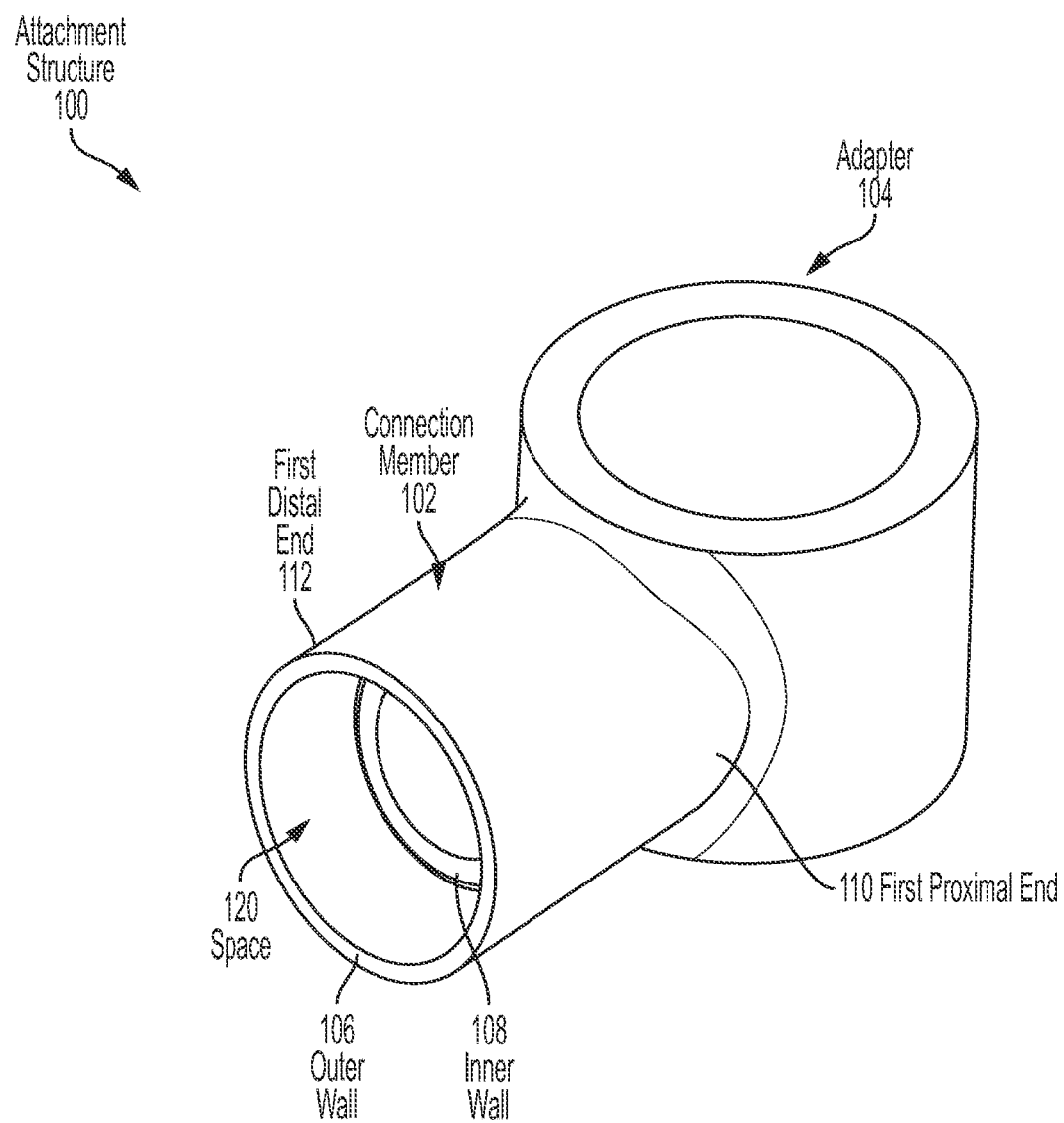
FIG. 1 is an isometric view of an example attachment structure, also referred to as an adapter or node, according an aspect of the disclosure.
Figure 2:
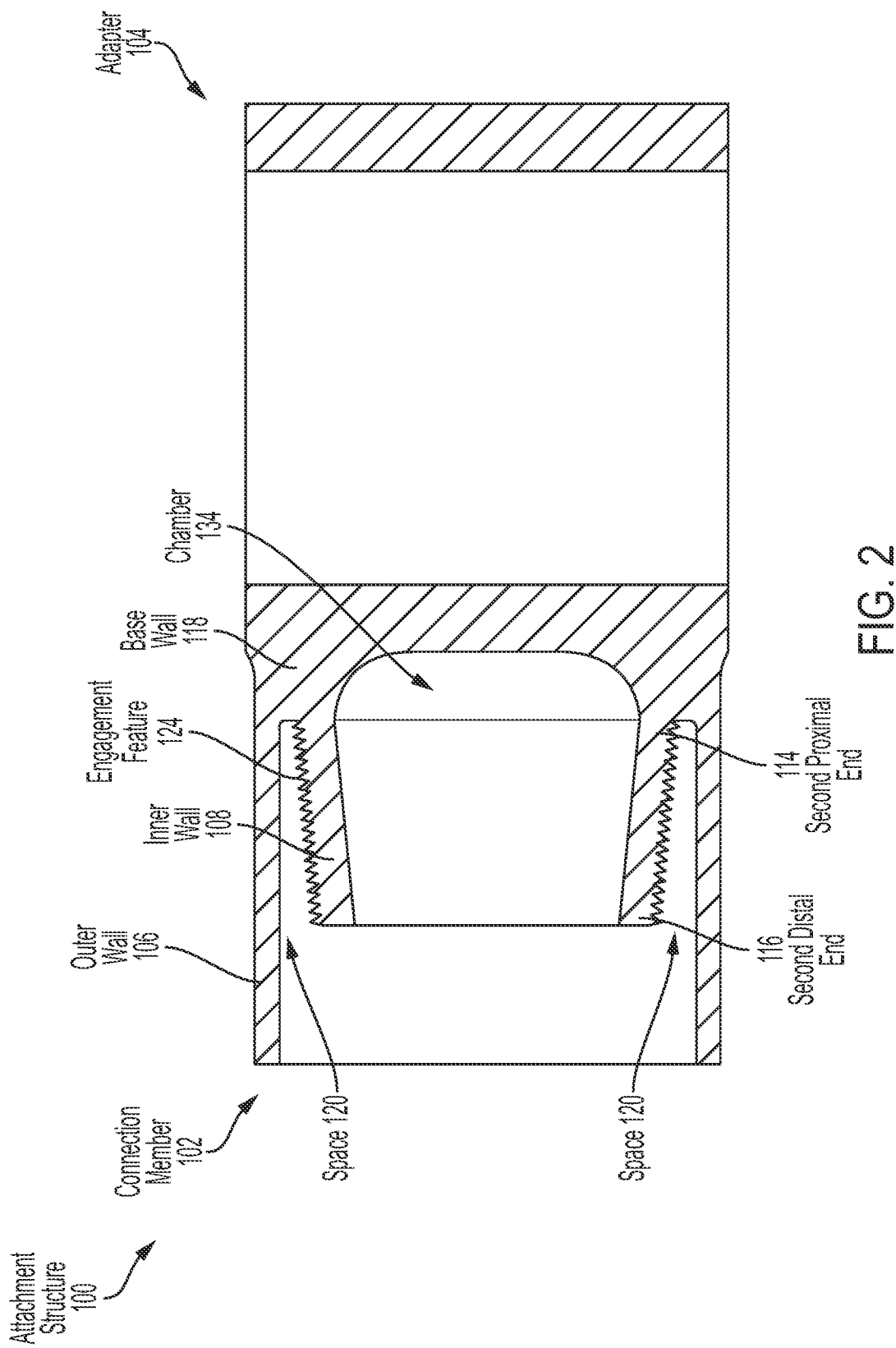
FIG. 2 is a cross-sectional view along a vertical axis of the attachment structure of FIG. 1.
Figure 3:
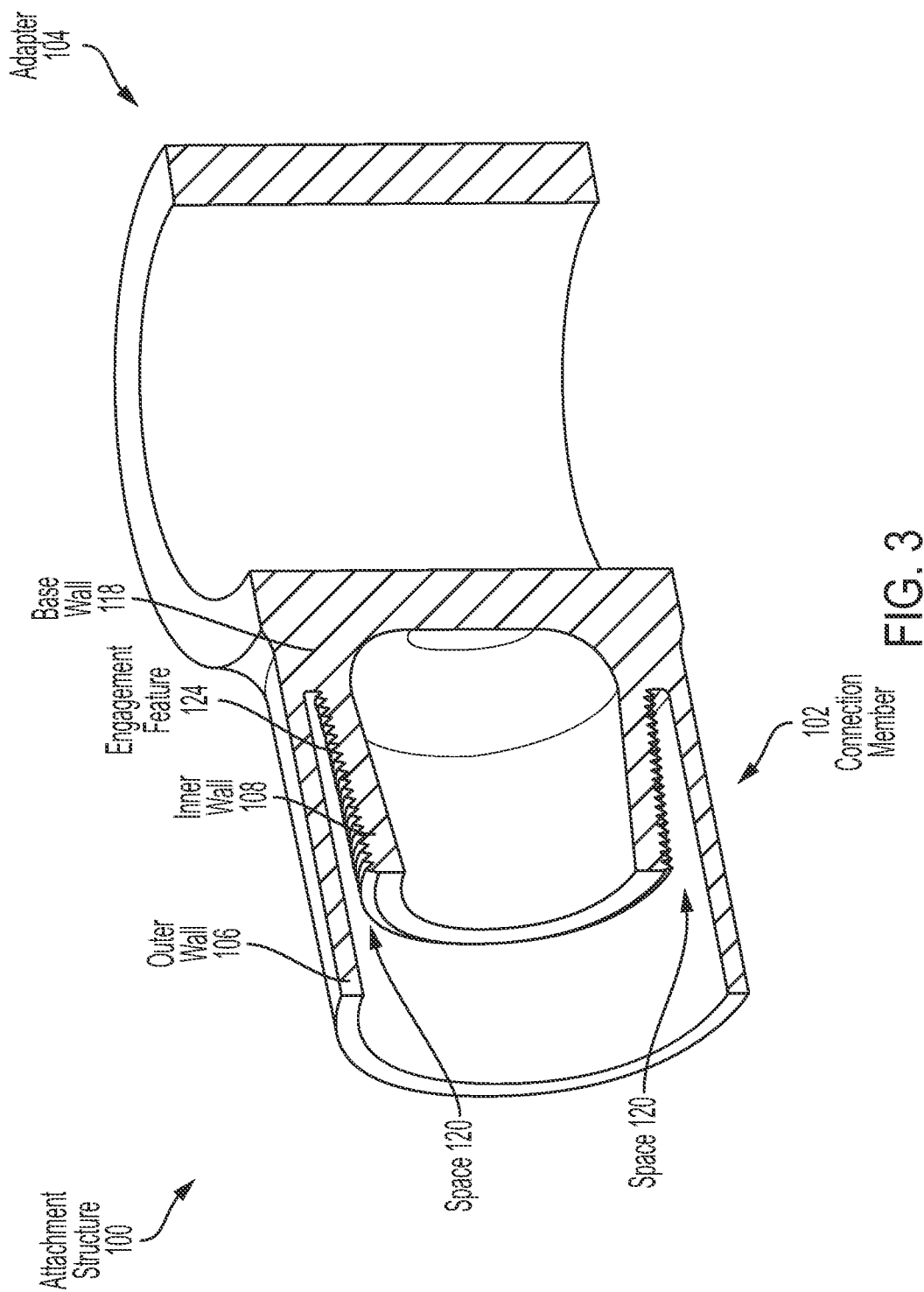
FIG. 3 is an isometric cross-sectional view along the vertical axis of the attachment structure of FIG. 1.

Various aspects of the disclosure are now described with reference to the drawings, wherein like reference numerals are used to refer to elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below.

Aspects of the disclosure include an attachment structure, e.g., an adapter or node, having multiple attachment features. The attachment structure may include a connection member with at least two different features for attaching to a tube. The attachment structure may additionally include a second connection member configured to receive an additional structure so multiple structures may be interconnected to one another.

In one example implementation, which should not be construed as limiting, an attachment structure, e.g., an adapter or node, is configured to adhesively and mechanically connect to a pipe or tube, such as a carbon fiber or composite pipe. The attachment structure comprises a connection member configured to receive the pipe or tube and connect to the pipe or tube with two different attachment features. For instance, the connection member may include a threaded surface, which may be tapered, and/or another means of mechanical connection. Additionally the connection member may include a surface opposing an adjacent surface of the tube and configured to receive an adhesive to further connect the adapter to the corresponding pipe or tube.

The described attachment structure with multiple attachment features provides joint strength benefits, durability benefits, and allows for two load paths instead of a traditional single load path joint. Additionally, the attachment structure may be formed via 3D printing, which allows for the creation of a complex geometry in a small space. Finally, the threaded surface, which may be tapered, facilitates load transfer between the tube and the attachment structure while also functioning as a centering feature to facilitate even seating of the tube into the attachment structure.

Referring to FIGS. 1-6, in one example implementation that should not be construed as limiting, an attachment structure 100 includes an adapter 104 and a connection member 102 having multiple attachment features configured to connect to a first structure. Optionally, or in addition, the connection member 102 may be fixedly connected to or formed together with a separate adapter 104 configured to connected to a second structure. Consequently, the attachment structure 100, also referred to herein as an adapter or node, may be used to connect multiple different structures, such as in space frame construction applications. For example, referring to FIGS. 4-6, an assembly structure 101 includes the attachment structure 100 wherein the connection member 102 may connect to a first tube or pipe 122, such as at a first angle, while adapter 104 may connect to a second tube or pipe (not illustrated), such as at a second angle different from the first angle. The connection member 102 includes an outer wall 106 and an inner wall 108. The outer wall 106 extends in a first direction from a first proximal end 110 of the outer wall 106 to a first distal end 112 of the outer wall 106. The inner wall 108 extends within the outer wall 106 from a second proximal end 114 (see, e.g., FIG. 2) of the inner wall to a second distal end 116 (see, e.g., FIG. 2) of the inner wall 108. The outer wall 106 and the inner wall 108 are connected at their respective proximal ends 110, 114 by a base wall 118. For example, in one implementation, outer wall 106 and inner wall 108 may be concentric cylindrical walls extending from base wall 118. Moreover, for example, the base wall 118 may be a wall that forms the adapter 104, such as but not limited to a cylindrical wall that longitudinally extends in a second direction different from a first direction along with the outer wall 106 and inner wall 108 extend. In an example, the first direction and the second direction may be perpendicular, but it should be understood that the first direction and the second direction may be perpendicular or at any oblique angle. The inner wall 108 may extend the full length of the outer wall 106, or may extend only partially within the outer wall 106, to where the length of the inner wall is less than that of the outer wall. In various embodiments, the length of the inner wall 108 may extend further than that of the outer wall 106 to where the inner wall 108 extends out of the outer wall 106.

Figure 4:
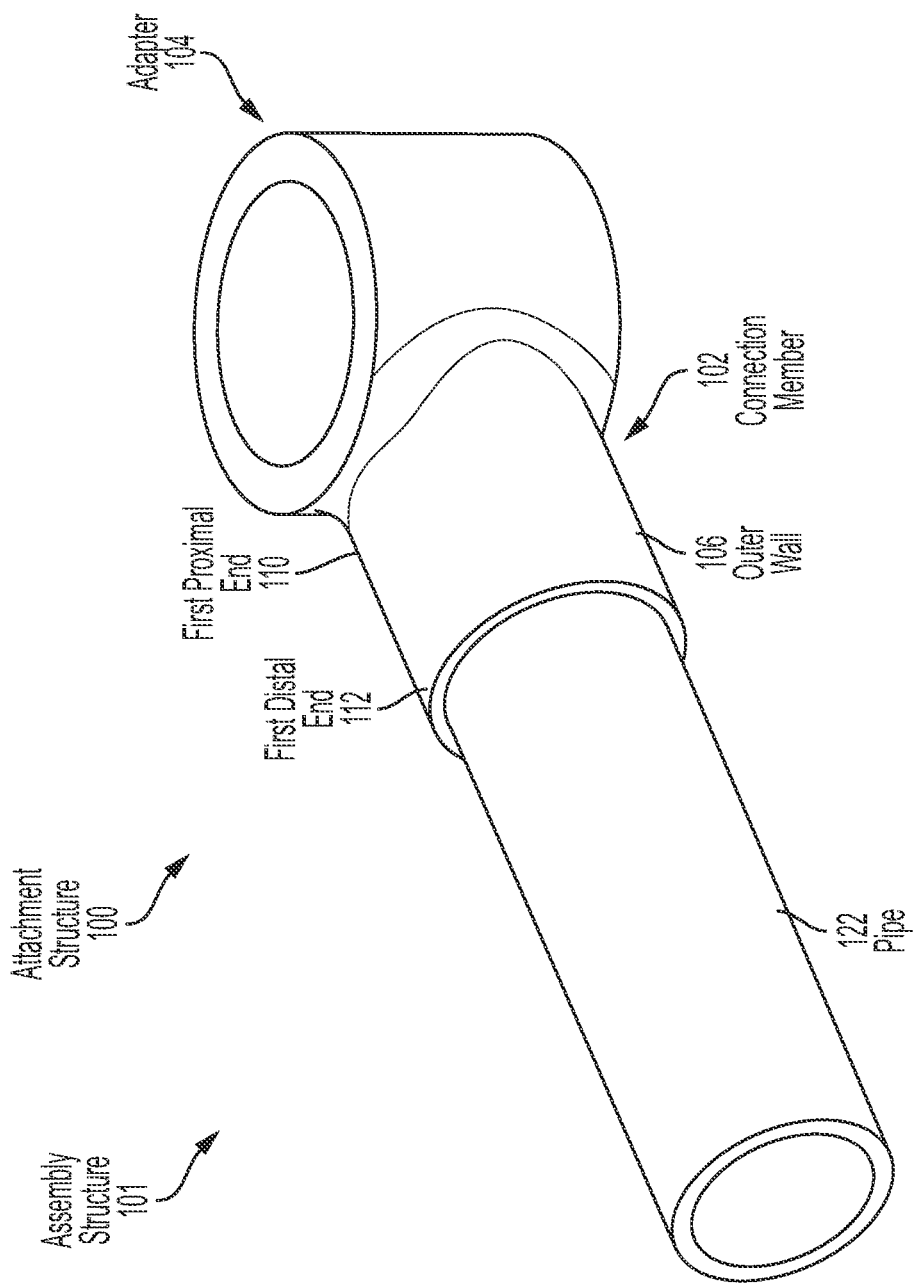
FIG. 4 is an isometric view of an assembly including a tube connected to the attachment structure of FIG. 1.
Figure 5:
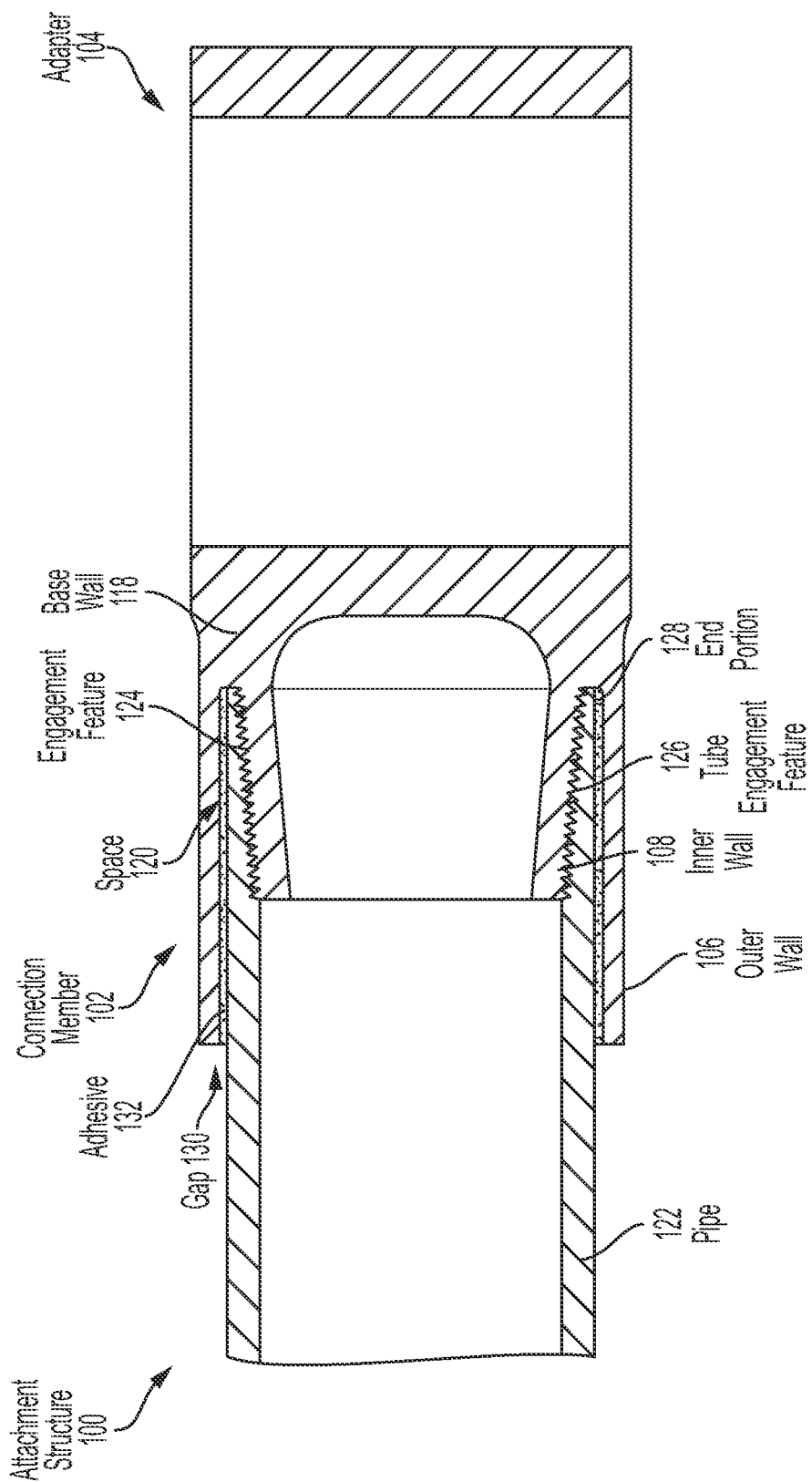
FIG. 5 is a cross-sectional view along a vertical line of the assembly of FIG. 4.
Figure 6:
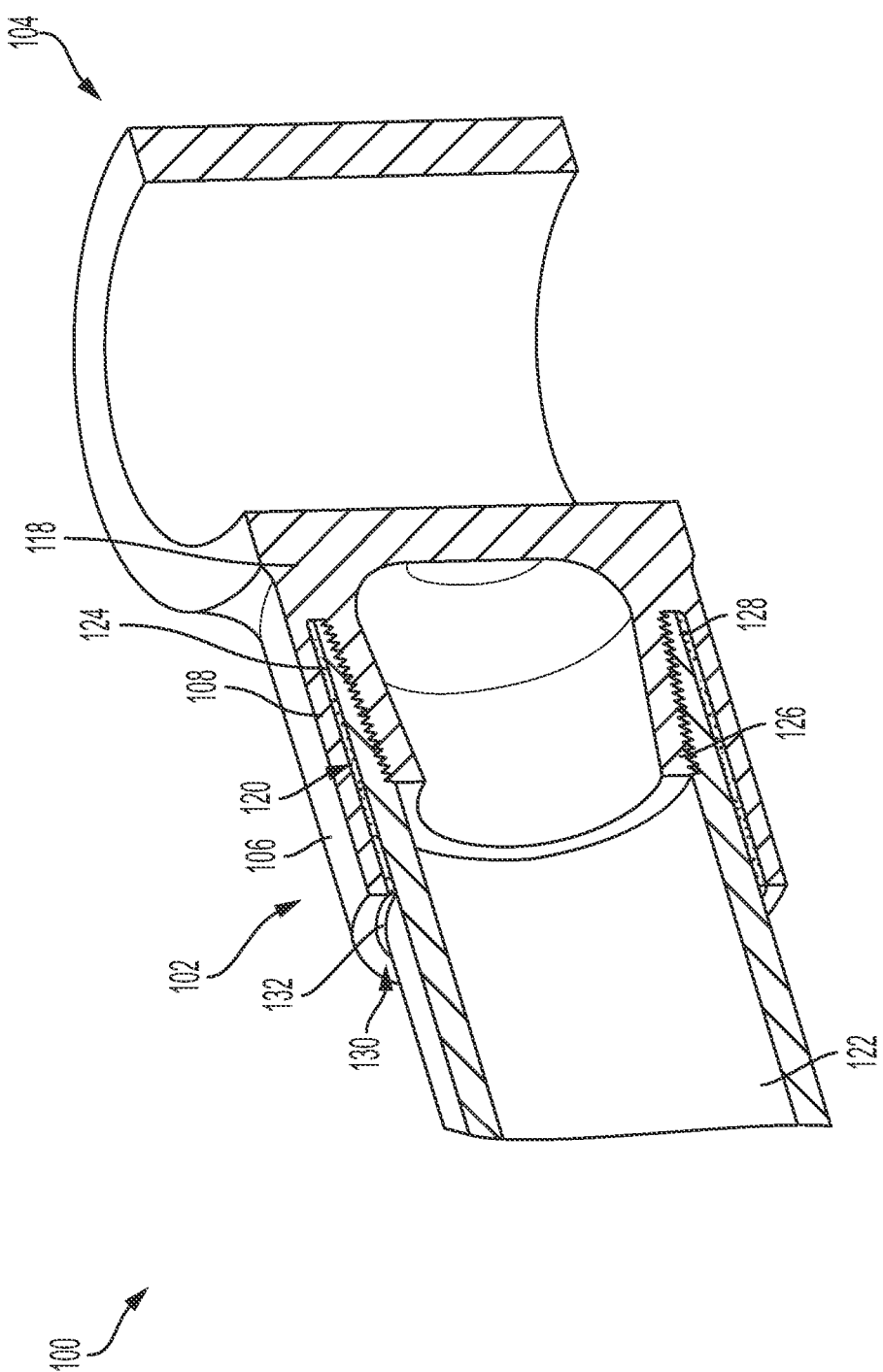
FIG. 6 is an isometric cross-sectional view along the vertical axis of the assembly of FIG. 4.

The outer wall 106, the inner wall 108 and the base wall 118 define a space 120 having multiple attachment features that is configured to receive and connect to another structure, such as a tube 122 (see, e.g., FIGS. 4-6). The space 120 is defined by the distance between the outer wall 106 and the inner wall 108 and the base wall 118, and more specifically the inner surface of the outer wall 106 and the outer surface of the inner wall 108 and an outer surface of the base wall 118. The space 120 may vary in size along the first direction between the base wall 118 and the respective distal ends 112, 116 of the outer wall 106 and inner wall 108. For example, as can be seen in FIGS. 1-6, the inner wall 108 may be tapered so that as the connection member 102 extends in the first direction away from the base wall 118 the space 120 increases in size along the first direction based on the distance between the outer wall 106 and inner wall 108 increasing along the first direction. It should be understood that although the outer surface of the inner wall 108 is illustrated as being tapered with the inner surface of the outer wall 106 being flat, the connection member 102 may have an opposite configuration where the inner surface of the outer wall 106 is tapered and the outer surface of the inner wall 108 is flat (e.g., such that space 120 has shape, in cross-section, that is a mirror image of the shape in FIG. 2). The tapering of the space 120 may help to center the tube 122 when it is being attached to the connection member 102.

The outer surface of the inner wall 108 further includes an engagement feature 124 configured to connect with a corresponding engagement feature 126 (see, e.g., FIGS. 5 and 6) of the tube 122. In an example implementation, the engagement feature 124 of the inner wall 108 includes a first threaded surface, while the engagement feature 126 of the tube 122 includes a corresponding second threaded surface. The cooperating engagement surfaces 124 and 126 are configured to rotatingly lock the tube 122 to the connection member 102, and/or to providing interfering structures (with respect to removal forces) to increase a resistance to removal of the tube 122 from the space 120 once the tube 122 is inserted into the space 120. In other words, once the tube 122 is rotatably or laterally positioned into the space 120, the cooperating engagement features 124, 126 mechanically lock the tube 122 within the space 120 of the connection member 102 and thereby prevent tube 122 from falling out or being pulled out of the attachment structure 100. It should be understood that the engagement features 124, 126 are not limited to a threaded surface, but may include other structures, an adhesive, or any mechanism that provides a mechanical engagement, such as but not limited to a rough surface, protrusions that dig into the tube 122, concentric rings (not spiral), barbs or hooks, etc., to lock the pipe within the space 120 of the connection member 102.

The inner surface of the outer wall 106 may be additionally configured with a separate connection feature to connect to the outer surface of the tube 122. In one example implementation, the inner surface of the outer wall 106 has a diameter sized relative to a diameter of the outer surface of the tube 122 to provide a gap 130 (see, e.g., FIGS. 5 and 6) in which an adhesive 132 (see, e.g., FIGS. 5 and 6) may be placed to bond the tube 122 to the connection member 102. For instance, the adhesive on the inner surface of the outer wall 106 and/or on the outer surface of the tube 122. This provides a second means of locking the tube 122 within the space 120 of the connection member 102. Therefore when the engagement features 124, 126 are engaged with one another, the inner surface of the outer wall 106 and the outer surface of the tube 122 are additionally adhered to one another thereby reinforcing the connection between the tube 122 and the adapter 104. This method of connection is utilized due to the joint strength benefits, durability benefits, and also to allow for two load paths instead of a traditional single load path joint. The load would be distributed between the connection created by the engagement features 124, 126 and the adhesive between the outer wall 106 and the tube 122, creating a joint with increased structural strength as compared to a join having a single connection feature.

In another example of the separate connection feature, the inner surface of the outer wall 106 and the outer surface of the tube 122 may also include threaded engagement portions and would in turn be connected in a similar manner to the threaded engagement features 124, 126 discussed above. In this example, the outer surface of the inner wall 108 and the inner surface of the tube 122 may be non-threaded engagement features 124, 126, e.g., such as being adhesively connected, to improve ease of assembly. This would allow for connection without the use of an adhesive and would continue to provide load distribution between the two connection points. This allows for customization of the joint for various applications.

As discussed above, the inner wall 108 may be tapered in the first direction and as such the engagement surface 124 of the inner wall 108 is similarly tapered in the first direction. The space, therefore, will increase in size along the first direction causing the space, or the distance between the outer wall 106 and the inner wall 108 to be larger at the distal of the connection member 102 than at the proximal end of the connection member. Similarly the diameter of the inner wall will decrease along the first direction. The tapering of the engagement feature 124 of the inner wall facilitates load transfer between the tube 122 and the adapter 104 while also functioning as a centering feature to facilitate even seating of the tube 122 into the adapter 104.

The tapering of the inner wall 108 and in turn the engagement surface 124 may be customized as required by a particular application. For example, in a particular application, the diameter at the proximal end of the inner wall 108 may be much greater than the diameter at the distal end of the inner wall 108, and therefore the space 120 will quickly increase in size along the first direction. In a different application the diameter at the proximal end of the inner wall 108 may only be slightly larger than the diameter at the distal end of the inner wall 108 and therefore the space 120 will only slightly increase along the first direction. This allows the structure of the joint to be highly customizable for various applications.

In various embodiments, the inner wall 108 may maintain a constant diameter along the first direction and the space 120 would therefore be constant along the first direction if the application so requires. In various embodiments, the outer wall 106 may also be tapered along the first direction. Therefore as the inner wall 108 decreases in diameter along the first direction the inside surface of the outer wall 106 or the entire outer wall 106 may increase in diameter along the first direction.

The tube 122 will also be tapered so as to correspond to the tapering of the inner wall 108. Therefore the inner surface of the tube 122 and in turn the engagement feature 126 of the tube will have a taper, which directly corresponds to that of the engagement feature 124 of the inner wall. For example, when inner wall 108 has a first, larger, diameter at the proximal end of the inner wall 108 that tapers to a second, smaller, diameter at the distal end of the inner wall 108, the inner surface of the tube 122 will have a first diameter at the opening of the tube 122 corresponding to the first diameter of the inner wall 108 and will taper at the same rate, as the engagement portion 124 of the inner wall 108, to the second diameter at the distal end of the inner wall 108. This allows for the engagement surface 124 of the inner wall 108 to fully engage with the engagement surface 126 of the tube 122.

In an additional aspect the base wall 118 may further engage with the end portion 128 of the tube 122 when the tube is inserted into the space 120 of the connection member 102. The base wall may 118 be modified in length to increase the distance between the proximal end of the outer wall 106 and the proximal end of the inner wall 108, and in turn increase the size of the space 120. Therefore if necessary to increase the size of the space 120 the length of the base wall 118 may be increased. Further, for additional support, adhesive may be placed on the base wall 118 and/or the end portion 128 of the tube 122. Therefore, when the tube 122 is connected to the adapter 104, there is an additional attachment surface between the base wall 118 and the end portion of the tube 122.

In an example implementation, as shown in FIGS. 1-6, when attaching the tube 122 to the attachment structure 100, the outer surface of the inner wall 108 is pre-threaded to create the engagement surface 124, and the inner surface of the tube 122 is similarly pre-threaded to create the engagement surface 126 of the tube 122. Adhesive 132 is then applied to the inside surface of the outer wall 106 of the connection member 102 and/or on the outside surface of the tube 122. Additional adhesive 132 may further be applied to the base wall and/or the end portion 128 of the tube 122.

The tube 122 is then inserted into the space 120 between the inner wall 108 and the outer wall 106 of the connection member 102. The tube 122 is locked into place within the space 120, fully filling the space 120, by rotating the tube 122 along the threads of the engagement portions 124, 126 of the connection member 102 and the tube until the end portion 128 of the tube engages the base wall 118, thereby locking the tube 122 within the space 120 of the connection member 102. The adhesive 132 between the outer wall 106 and the tube 122 and the base wall 118 and the end portion 128 of the tube 122 further bonds the tube 122 to the connection member 102. The plurality of attachment locations create a structurally sound joint between the tube 122 and the connection member 102.

In a further additional aspect (as is highlighted in FIG. 2) the inner wall 108 may define a chamber 134. In another aspect (not shown) the inner wall 108 includes an inner surface defining an open proximal end that communicates with the chamber 134. In this aspect the second connection portion of the adapter 104 is open to the connection member 102 and these sections are not separated by base wall 118.

In the above aspects, the attachment structure 100 may be 3-D printed. This allows for small complex structures to be created much more easily many of which cannot feasibly be created through the use of standard machining. This allows for the tapering of the inner wall 108 of the connection member 102 to be highly variable to match that of any tube 122 and allows for different load bearing combinations, which may be more acceptable in different applications.

The invention claimed is:
1. A structure comprising:
a connection member, including:
an outer wall extending in a first direction from a first proximal end to a first distal end;
an inner wall extending within the outer wall, in the first direction, from a second proximal end to a second distal end; and
a base wall extending from, and connecting, an inner surface of the outer wall to an outer surface of the inner wall between the first proximal end and the second proximal end; and
wherein the outer wall, the inner wall, and the base wall define a space having a distance between the outer wall and the inner wall that varies in the first direction, wherein the space is configured to fixedly position an end portion of a tube inserted into the space such that the end portion is fixed to the inner surface of the outer wall and the outer surface of the inner wall.

2. The structure of claim 1, wherein the outer surface of the inner wall includes an engagement feature configured to increase a resistance to removal of the tube from the space after being inserted into the space.

3. The structure of claim 2, wherein the engagement feature comprises at least a first threaded surface, a rough surface, protrusions that dig into the tube, concentric rings, barbs, or hooks.

4. The structure of claim 3, further comprising:
the tube inserted into the space, wherein an inner surface of the tube comprises a second threaded surface corresponding to the first threaded surface.

5. The structure of claim of claim 4, wherein the second threaded surface is at least pre-threaded before the insertion of the tube into the space or formed by the first threaded surface when the tube is inserted into the space.

6. The structure of claim 1, wherein the inner surface of the outer wall includes an engagement feature configured to increase a resistance to removal of the tube from the space after being inserted into the space.

7. The structure of claim 1, further comprising:
the tube inserted into the space; and
an adhesive that at least adheres the inner surface of the outer wall to an outer surface of the tube or adheres the outer surface of the inner wall to an inner surface of the tube.

8. The structure of claim 1, wherein the distance between the outer wall and the inner wall increases in the first direction.

9. The structure of claim 1, wherein a diameter of the outer surface of the inner wall of the connection member decreases in the first direction.

10. The structure of claim 1, wherein the inner surface of the outer wall of the connection member has a constant diameter in the first direction.

11. The structure of claim 1, wherein a diameter of the inner surface of the outer wall of the connection member increases in the first direction.

12. The structure of claim 1, wherein an inner diameter of an inner surface of the inner wall of the connection member decreases or remains constant in the first direction.

13. The structure of claim 1, wherein the outer surface of the inner wall of the connection member decreases in diameter in the first direction and the inner surface of the outer wall of the connection member has a constant diameter in the first direction.

14. The structure of claim 1, wherein the connection member is configured to form a gap between an end surface of the end portion of the tube and the base wall when the tube is inserted into the space, and further configured to include an adhesive in the gap to adhere the tube to the connection member.

15. The structure of claim 1, wherein the outer wall has a first longitudinal length in the first direction, wherein the inner wall has a second longitudinal length in the first direction, and wherein the first longitudinal length is greater than the second longitudinal length.

16. The structure of claim 1, wherein the connection member further comprises a base member, wherein the outer wall and the inner wall extend from the base member.

17. The structure of claim 16, wherein the base member includes an internal wall defining a chamber, and wherein the inner wall includes an inner surface defining an open proximal end that communicates with the chamber.

18. The structure of claim 1, wherein the connection member is 3-D printed.

* * * * *